Sept. 25, 1962 H. E. HILDEBRAND, SR 3,055,723
COMBINATION TRANSPORTING AND DISPLAY RACK
Filed Oct. 31, 1960
2 Sheets-Sheet 1
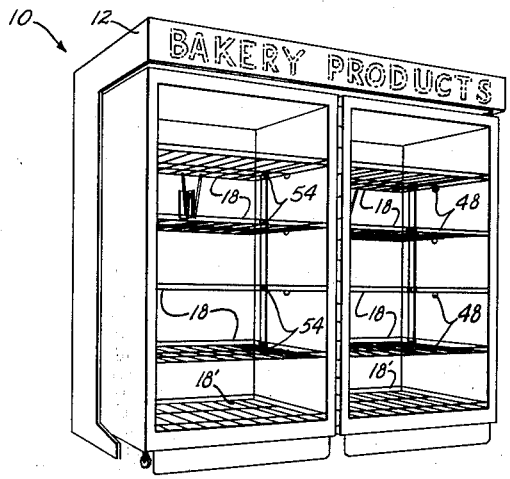
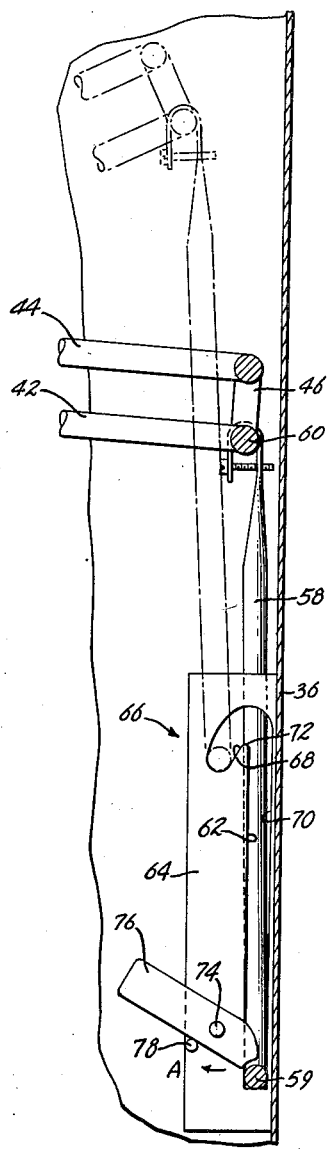
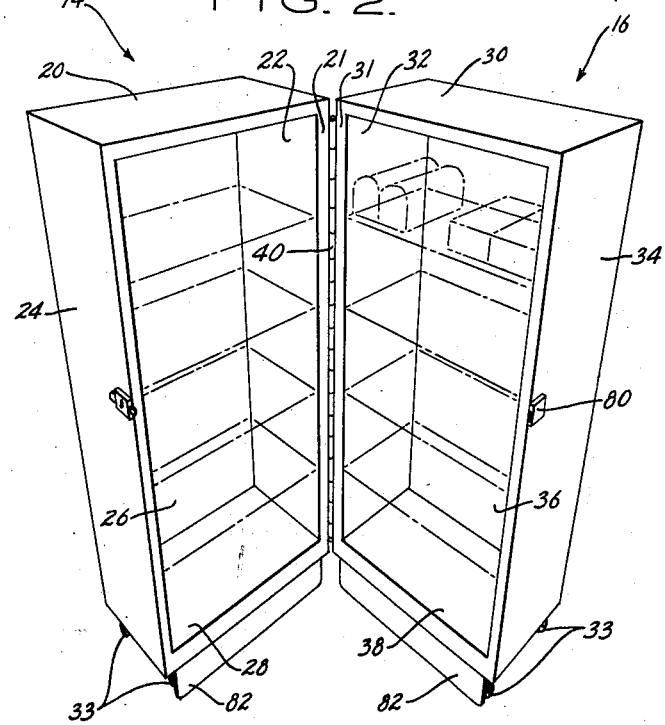
INVENTOR.
H. E. HILDEBRAND, SR.
BY
Morgan, Finnegan, Durham & Pine
ATTORNEYS

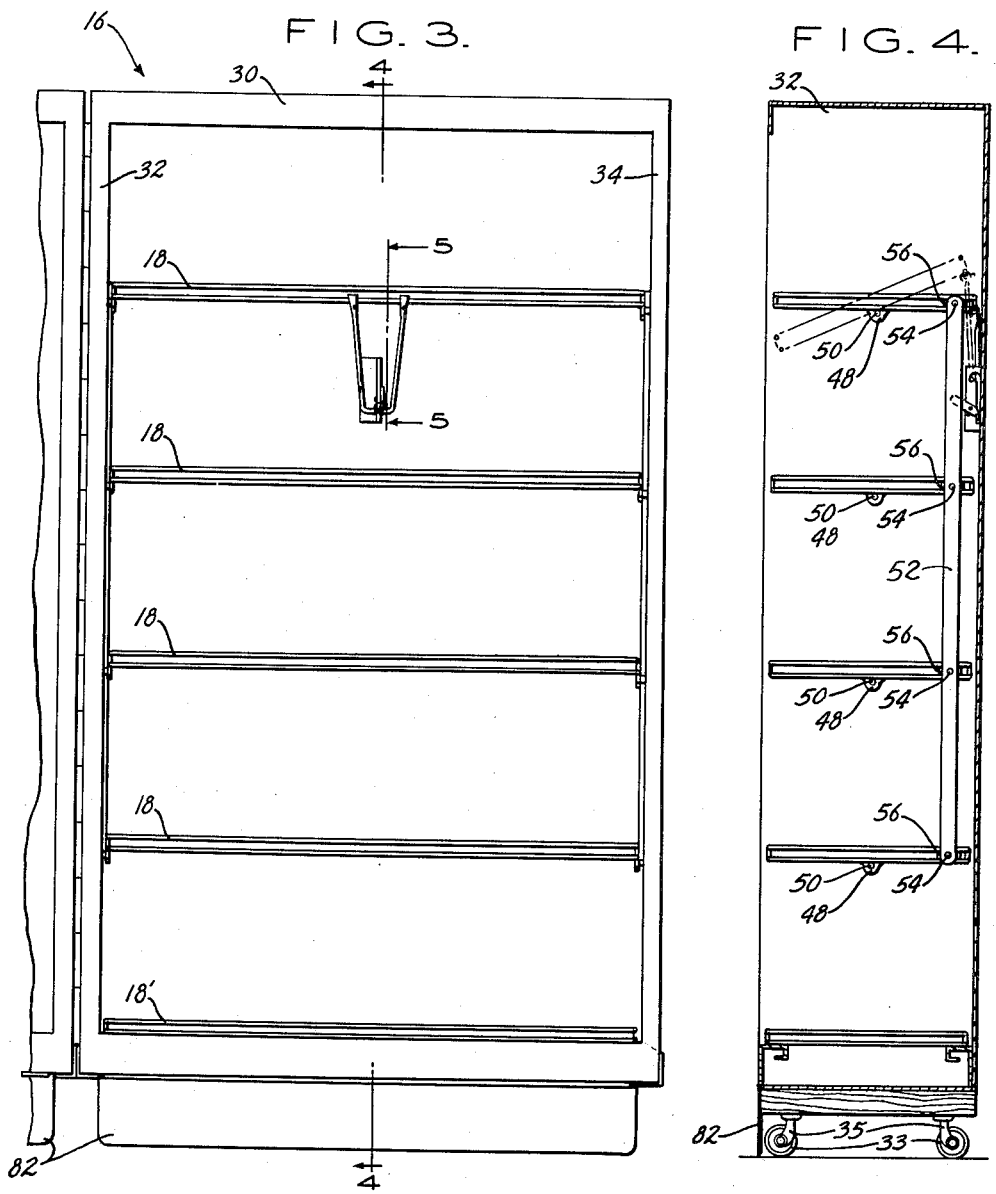

United States Patent Office 3,055,723
Patented Sept. 25, 1962

3,055,723
COMBINATION TRANSPORTING AND
DISPLAY RACK
Hendrick Edward Hildebrand, Sr., Mount Vernon, N.Y.,
assignor to Continental Baking Company, Rye, N.Y., a
corporation of New York
Filed Oct. 31, 1960, Ser. No. 65,991
2 Claims. (Cl. 312—200)

The present invention relates to storage and transportation devices and, more particularly, to a portable storage rack, portions of which are pivotally interconnected for movement from an open display position to a closed transporting position.

Generally packaged baked goods including bread, cakes, rolls and the like are delivered by truck to local consumer outlets such as grocery stores, delicatessens and supermarkets. The baked goods are generally stacked on shelves or in hampers in the trucks, and the delivery man manually carries the individual baked items from the truck into the store for placement on the display shelves. He then carries return goods back to the truck from the store. It will be evident that each trip back and forth offers opportunity for damage to the delicate baked goods. Further, the delivery man must keep track of each delivery item and return item for proper billing of the storekeeper. Likewise, because of the trips necessitated by this system, the truck must be repeatedly locked and unlocked or alternatively left unguarded for substantial periods of time, inviting pilferage of the truck's contents.

To overcome the problems heretofore surrounding the delivery of baked goods, the present invention is characterized by a novel display and transportation rack. The rack is provided with a plurality of sections which are foldable to and from a closed transportation position to an open display position. The rack includes a number of interconnected and pivoted display shelves and is provided with wheels for easy movement from place to place. The shelves are loaded at the bakery and the sections folded to closed position and locked. The locked rack is placed on the truck and at its destination the entire rack is wheeled, still locked, from the truck to its display position in the store. The sections are then unlocked and folded into open display position. The rack, previously in the display position, is folded to closed position, locked and returned to the truck. Thus a simple and efficient solution is presented to the problems of baked goods deliveries since there is no possibility of damage to the goods as they are transported in a rigid container. The number of delivered items and returned items can be checked quickly and accurately at the bakery from the number of items in the rack delivered and the number in the rack returned. And by employing locked racks, pilferage is practically eliminated.

It is therefore an object of the present invention to provide a novel transportation and display rack having a plurality of sections pivotally interconnected for movement from a closed transportation position to an open display position.

Another object of the invention is to provide a novel closable transportation and display rack having a plurality of interconnected tiltable shelves.

A further object of this invention is to provide a novel transportation and display rack having a pair of display sections pivotally interconnected and having spaced, tiltable shelves.

For a more complete understanding of the present invention, reference should be had to the accompanying drawings, wherein like reference numerals indicate like parts:

FIG. 1 is a perspective view illustrating the display and transportation rack embodying the present invention in position in the display case;

FIG. 2 is a perspective view illustrating a display and transportation rack embodying the present invention in partially open position;

FIG. 3 is a front view of the sections of the display rack embodying the invention;

FIG. 4 is a side sectional view taken on line 4—4 of FIG. 3; and

FIG. 5 is a detailed view of the shelf of the lock mechanism taken on line 5—5, FIG. 3.

Referring to FIG. 1, a display rack 10 embodying the invention is shown in open display poistion in a suitable display case 12. Rack 10 includes at least two elongated display sections 14 and 16 having a plurality of spaced shelves 18 disposed therein. Section 14 is open at the front and provided with top member 20, side members 22 and 24, back member 26 and bottom member 28. Section 16 is likewise open at the front and includes a top member 30, side members 32 and 34, back member 36 and bottom member 38.

Side members 22 of section 14 and side member 32 of section 16 are pivotally interconnected adjacent the front edges 21 and 31 thereof by an elongated longitudinal hinge member 40. Hinge member 40 is preferably a single elongated piano hinge, but a plurality of separate smaller hinges could be employed without adverse effect. Hinge 40 is fastened to members 22 and 32 in such manner that sections 14 and 16 are adapted for movement from a completely closed position with the fronts thereof in opposed abutting relation to a completely open position with side 22 adjacent side 32, as shown in FIG. 3.

To facilitate movement and adapt rack 10 for portability, there are provided wheels 33 carried in swivel arms 35 fixed to each corner of bottom members 28 and 38.

To support baked goods therein, each section 14 and 16 is provided with a plurality of shelves 18. Shelves 18 are disposed in spaced relationship in their associated sections 14 or 16, with all shelves but the bottom ones 18' being movably mounted therein. Shelves 18 each include a generally rectangular bottom 42 preferably of open, grate-like construction (see FIG. 1). A guard rail 44 is spaced from the upper surface of bottom 44 and supported thereon at each corner thereof by corner supports 46.

The movable shelves 18 are provided with a bracket 48 on the undersurface of bottom 42 at each side thereof. Each bracket 48 rotatably accommodates a stud shaft 50 therein fixed to the inside face of adjacent side members 22, 24, 32 and 34.

To move shelves 18, an actuating bar 52 is provided for each section 14 and 16 adjacent side 22 and 32. Bar 52 is pivotally connected to each of the shelves 18 by a pin 54 carried in a block 56 fixed to each shelf between bottom 42 and guard rail 44. By moving bar 52 upwardly, each movable shelf 18 is then pivoted about stud shaft 50 as shown in dotted lines, FIGI. 4, to raise the rear portion of shelf 18 and lower the front portion thereof. Thus the baked goods on shelf 18 are disposed in the field of view of prospective purchasers and are readily accessible.

Latch means is included for locking shelves 18 in raised position. This latch means includes a generally U-shaped arm 58 pivotally supported at its upper ends to back bar 60 of the bottom 42 of a shelf 18 adjacent the middle thereof. The lower curved portion 59 of arm 58 is disposed in an elongated slot 62 in the outstanding leg 64 of an angle member 66 fixed to the inside of its associated back member 26 or 36. Slot 62 includes an upper curved section 68 which communicates with the elongated straight section 70 around a nose 72. Fixed to leg 64 adjacent the bottom of slot 62 is a pin 74 which rotatably supports a lock arm 76. A stop pin 78 is fixed to leg 64 adjacent the bottom of arm 76 to limit rotation of arm 76 about pin 74.

In operation, baked goods B are placed on horizontally disposed display shelves 18 at the bakery. Sections 14 and 16 are then pivoted about hinge 40 into closed position. A conventional locking member 80 is suitably actuated to secure the sections in closed position and lock rack 10. Rack 10 is then wheeled onto its transporting carrier (not shown) for delivery to a store.

At its destination, rack 10 is wheeled from its carrier to display case 12. At case 12, locking member 80 is actuated to unlock rack 10, and sections 14 and 16 are swung to open position. With sections 14 and 16 in open display position, rack 10 is wheeled into position in case 12 as shown in FIG. 1, and bars 52 of each section 14 and 16 are moved upwardly to tilt shelves 18 into display position as shown in phantom, FIG. 4. A skirt 82 hinged to the front of each bottom member 28 and 38 is pivoted into position, shown in FIGS. 3 and 4, concealing wheels 33 and presenting a finished appearance to rack 10 in display case 12.

As shelves 18 are tilted upwardly, lock arm 76, normally resting on stop pin 78 as shown in FIG. 5, is pivoted in the direction of the arrows, FIG. 5, releasing arm 58 for travel in slot 62. U-arm 58, carried by a shelf 18, is raised by the upward tilting of its associated shelf 18 as shown in dotted lines, FIG. 5, travelling the curved portion 57 of arm 58 through the elongated portion 70 of slot 62 around nose 72 into curved section 68. Curved section 68 and nose 72 thus cooperate to maintain arm 58 in raised position against inadvertent return to its lower position in the bottom of slot 62.

When shelves 18 are to be returned to horizontal position, arm 58 is raised slightly to travel curved section 57 thereof around nose 72 into elongated portion 70. Arm 58 is then lowered, moving section 57 down through slot 62 toward the bottom thereof. On its return, section 57 pivots arm 76 in the direction of the arrows, FIG. 5, out of its path of travel. When section 57 is resting at the bottom of slot 62, lock arm 76, so weighted as to be normally biased by gravity against pin 78, returns to its locking position thereagainst.

Thus there is disclosed a simple, efficient transportation and display rack having pivotally interconnected sections and pivotable, spaced display shelves.

What is claimed is:

1. A display and transporting rack for bakery products comprising a pair of sections having top, bottom, side and back members, hinge means for pivotally interconnecting said sections, means mounting said hinge means to a side member of each section adjacent the front edge thereof remote from said back member, said hinge means adapting said sections for movement to and from closed transporting position with the front of said sections in opposed abutting relationship to and from an open position with said interconnected side members disposed adjacent each other, shelves in said sections for supporting baked goods thereon, means pivotally mounting a plurality of said shelves on the side member of said sections, an operating bar for the movable shelves of each section, and means pivotally connecting said bar to each of its associated shelves to effect movement of said shelves upon actuation of said bar, whereby baked goods on said shelves are moved to and from horizontal transport position to and from raised display position, a latch member for each section for maintaining said shelves in raised display position including a lock arm, means pivotally mounting one end of said lock arm to one of said movable shelves, a bracket having a cam track provided therein, said cam track including an elongated straight section, and means mounting the other end of said lock arm for movement in said cam track, whereby as said associated shelf is raised, the end of said arm in said track is traveled from said elongated section into said curved lock section maintaining said shelves in raised position.

2. The invention as defined in claim 1 including a stop arm pivotally mounted to said bracket, a stop pin fixed to said bracket to limit the pivotal movement of said stop arm, and means normally bracing said stop arm against said stop pin with an end thereof in the path of travel of the end of said lock arm in said cam track to selectively maintain said lock arm against movement in said cam track.

References Cited in the file of this patent

UNITED STATES PATENTS

| | | |
|---|---|---|
| 258,604 | Richardson | May 30, 1882 |
| 426,964 | Schliemann | Apr. 29, 1890 |
| 1,471,532 | Sheets | Oct. 23, 1923 |
| 2,209,294 | Froelich | July 23, 1940 |